(12) United States Patent
Xiong et al.

(10) Patent No.: US 11,059,170 B2
(45) Date of Patent: Jul. 13, 2021

(54) JOINT LIMIT DETECTION METHOD, AND ROBOT WITH THE SAME

(71) Applicant: UBTECH Robotics Corp, Shenzhen (CN)

(72) Inventors: Youjun Xiong, Shenzhen (CN); Gaobo Huang, Shenzhen (CN); Hailang Zhou, Shenzhen (CN); Musen Zhang, Shenzhen (CN)

(73) Assignee: UBTECH Robotics Corp, Shenzhen (CN)

( * ) Notice: Subject to any disclaimer, the term of this patent is extended or adjusted under 35 U.S.C. 154(b) by 288 days.

(21) Appl. No.: 16/359,965

(22) Filed: Mar. 20, 2019

(65) Prior Publication Data

US 2019/0329406 A1 Oct. 31, 2019

(30) Foreign Application Priority Data

Apr. 27, 2018 (CN) .......................... 201810394605.1

(51) Int. Cl.
*B25J 9/16* (2006.01)
*B25J 9/12* (2006.01)

(52) U.S. Cl.
CPC .............. *B25J 9/1628* (2013.01); *B25J 9/126* (2013.01)

(58) Field of Classification Search
CPC .................... B25J 9/126; B25J 9/1628; G05B 2219/39001; G05B 2219/39096; G05B 2219/40264; G05B 2219/40288; G05B 2219/40344; G05B 2219/40371; G05B 2219/40492; G05B 2219/40552

See application file for complete search history.

(56) References Cited

U.S. PATENT DOCUMENTS

2014/0379128 A1* 12/2014 Ishikawa ................ B25J 9/1674
                                                       700/250
2020/0108502 A1* 4/2020 Nakayama ............. B25J 19/023

* cited by examiner

*Primary Examiner* — Dale Moyer

(57) ABSTRACT

The present disclosure provides a joint limit detection method, apparatus, and robot with the same. The method includes: (a) determining a servo corresponding to a joint to be detected; (b) controlling an output shaft of the servo to rotate in a preset first direction; (c) measuring a rotational angle of the output shaft within a preset first duration; (d) determining whether the rotational angle of the output shaft is greater than a preset angle threshold; (e) repealing the steps (c) and (d) until the rotational angle of the output shaft is less than or equal to the preset angle threshold, if the rotational angle of the output shaft is greater than the angle threshold; and (f) determining a current rotational position of the output shaft as a first extreme position, if the rotational angle of the output shall is less than or equal to the angle threshold.

17 Claims, 4 Drawing Sheets

JOINT LIMIT DETECTION METHOD, AND ROBOT WITH THE SAME

CROSS REFERENCE TO RELATED APPLICATIONS

This application claims priority to Chinese Patent Application No. 201810394605.1, filed Apr. 27, 2018, which is hereby incorporated by reference herein as if set forth in its entirety.

BACKGROUND

1. Technical Field

The present disclosure relates to robot technology, and particularly to a joint limit detection method, and robot with the same.

2. Description of Related Art

An important feature of humanoid robots is that they have moveable limbs such as hands, arms, and heads which are similar to the human body. At present, the movement of the limbs of humanoid robots is mainly driven by servos. To control a limb of a robot to move is actually to control joints of different parts of the limb to rotate for specific angles so as to pull the limb to the move, thereby realizing the movement of the overall robot.

Because of the assembly structure of a robot, the rotational angle of each joint on the robot is limited. At present, the limit of the angle of each joint of the robot of various manufacturers are fixedly arranged according to the installation relationship of the servo of each joint on the robot. For different robots produced according to the same design scheme, the limits of the joints of the same part tend to be different due to the differences in the structural parts and the assembly. For example, for the pitch joint of the head, according to the standard design of the joint, it has a movement angular range of 180-300 degrees. However, due to the difference in the structural parts and the assembly, some robots may have a movement angular range of 180-300 degrees, others may have a range of 170-288 degrees or 186-305 degrees. In the actual usages, if these robots all move according to the movement angular range according to the standard design, it may exceed the actual movement angular range, which causes the joints to be worn.

BRIEF DESCRIPTION OF THE DRAWINGS

To describe the technical schemes in the embodiments of the present disclosure more clearly, the following briefly introduces the drawings required for describing the embodiments or the prior art. Apparently. The drawings in the following description merely show some examples of the present disclosure. For those skilled in the art, other drawings can be obtained according to the drawings without creative efforts.

DETAILED DESCRIPTION

In order to make the object, the features and the advantages of the present disclosure more obvious and easy to understand, the technical solutions in the embodiments of the present disclosure will be clearly and completely described below in conjunction with the drawings in the embodiments of the present disclosure. Apparently, the following embodiments are only part of the embodiments of the present disclosure, not ail of the embodiments of the present disclosure. All other embodiments obtained by those skilled in the art without creative efforts are within the scope of the present disclosure.

Figure 1:
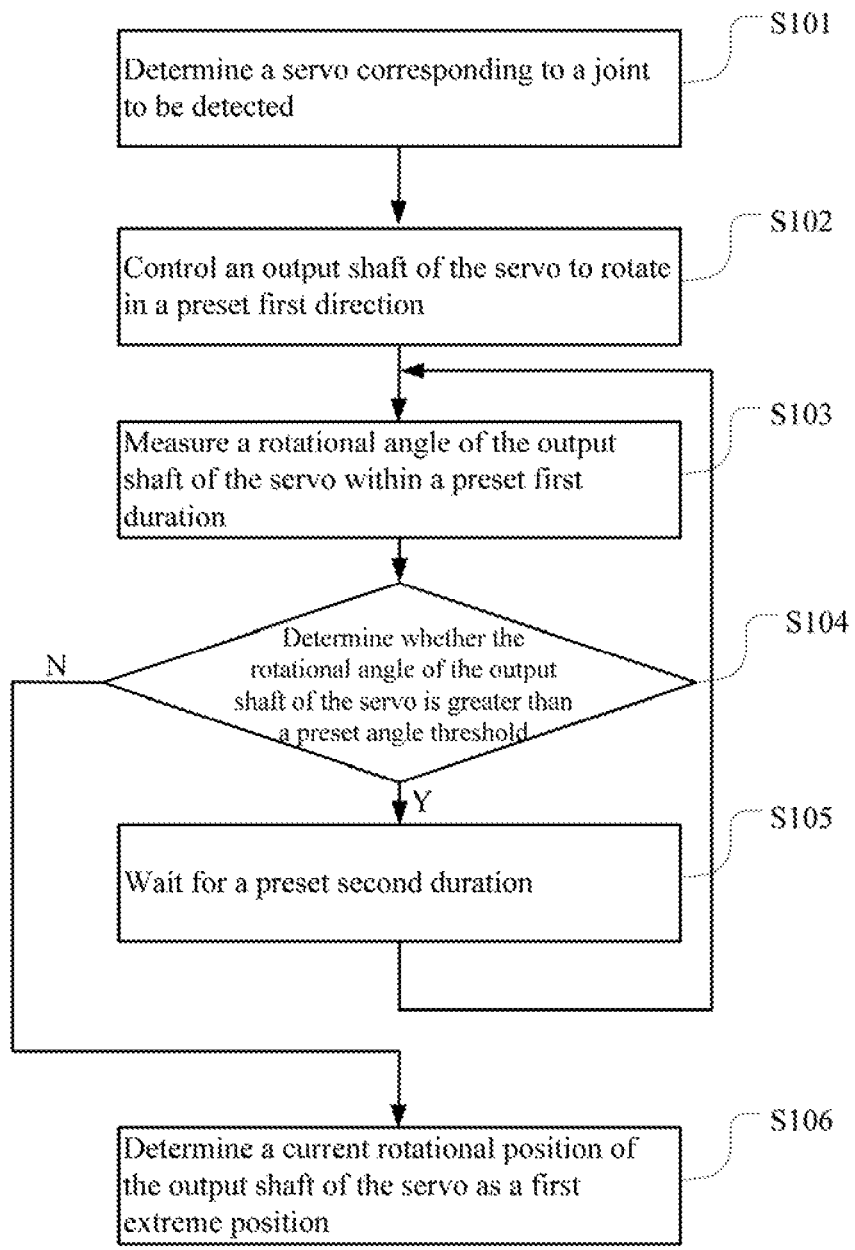
FIG. 1 is a How chart of using a joint limit detection method to detect a first extreme position according to an embodiment of present disclosure.
Figure 3:
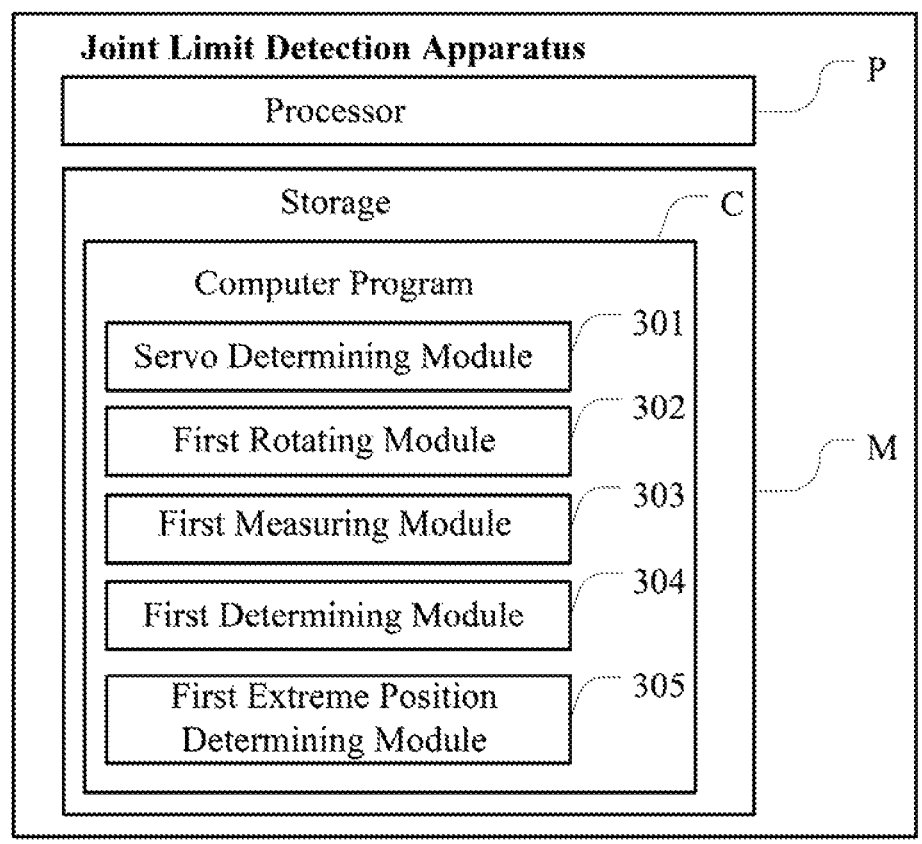
FIG. 3 is a schematic block diagram of a joint limit detection apparatus according to an embodiment of present disclosure.

FIG. 1 is a How chart of using a joint limit detection method to detect a first extreme position according to an embodiment of present disclosure. In this embodiment, a joint limit detection method is provided. The method is a computer-implemented method executable for a processor, which may be implemented through a joint limit detection apparatus as shown in FIG. 3, for example, a portable electronic device, or through a storage medium. The method may be applied to a robot having a plurality of joints, and each of the joints has a servo (see FIG. 4). In which, the joint is for realizing the movement of a limb (e.g., a hand, an arm, a leg, or a head) of the robot which connected to the joint, where each joint includes the servo driven by a motor, and the movement of the limb is realized b the motor of each servo to rotate an output shaft of the servo which is connected to the limb. As shown in FIG. 1, the method includes the following steps.

S101: determining a servo corresponding to a joint to be detected.

The movements of each joint of the robot such as the joint of the hand, the arm, or the head are driven by its corresponding servo(s), and the different joints are driven by different servos. When a limit of a certain joint is to be detected, the servo corresponding to the joint has to be determined first according to the relationship between the joint and the servo. For example, suppose that the robot has three servos which are respectively marked as servo 1, servo 2, and servo 3. In which, servo 1 is used to drive a hand joint to move, servo 2 is used to drive an arm joint to move, and servo 3 is used to drive a head joint to move. In the case that the limit of the head joint is to be detected, according to the above-mentioned relationship, it is determined that the corresponding servo should be servo 3. In this embodiment, the joint is located at a head, a limb, and a waist of the robot.

S102: controlling an output shaft of the servo to rotate in a preset first direction.

The first direction may be a direction in which the output shaft of the servo rotates clockwise, or may be a direction in which the output shaft of the servo rotates counterclockwise.

The initial speed of the servo to rotate can be set according to actual conditions. For example, it can be set to 0.1 radians/second, 0.2 radians-second, or 0.5 radians/second. In one embodiment, the initial speed may be positively correlated with a movement angular range according to the standard design of the joint, that is, if the movement angular range of the output shaft of the servo according to the standard design is large, the initial speed is fast; otherwise, if the movement angular range of the output shaft of the servo according to the standard design is small, the initial speed is slow. Through such a setting manner, the overall detection time can be restricted within a relatively fixed time range, thereby avoiding the case that the detection time is too long, and also avoiding the case that the detection time is too fast which causes low detection accuracy or the case that the joint is worn.

In the detection process, it generally takes a zero position obtained by performing a zero correction on the servo as an initial position. In one embodiment, before step S102, it may be first determined whether the output shaft of the servo is at a preset reference position; if not, the output shaft of the servo is adjusted to the reference position; and if so, step S102 can be directly executed. The reference position is the zero position obtained by performing the zero correction on the servo.

S103: measuring a rotational angle of the output shaft of the servo within a preset first duration.

The first duration may be set according to actual conditions, while it generally should not be too long. For example, it may be set to 0.1 second, 0.2 second, 0.5 second, or the like.

In one embodiment, after measuring the rotational angle, the rotational speed of the output shaft of the servo can be adjusted according to the accumulated rotational angle of the output shaft of the servo such that the rotational speed of the output shaft of the servo is negatively correlated with the accumulated rotational angle of the output shall of the servo. In which, the accumulated rotational angle is the sum of all the measured rotational angles of the output shaft of the servo (i.e., the rotational angles of the output shaft of the servo which are measured by step S103). For example, in a specific implementation of this embodiment, the following relationship may be established between the rotational speed of the output shaft of the servo and the accumulated rotational angle of the output shaft of the servo:

$$v = v_0 - k \times \sum_{i=1}^{T} \varphi_t$$

where, v is the rotational speed of the output shaft of the servo; $v_0$ is the initial speed of the output shaft of the servo: k is a preset proportional coefficient which may be set to, for example, 0.01, 0.02, 0.05, or the like according to actual conditions; and $\varphi_t$ is the rotational angle of the output shaft of the servo in the t-th measurement, $1 \le t \le T$, T is the number of times of the rotational angle of the output shaft of the servo has been measured.

That is, as the accumulated rotational angle of the output shaft of the servo becomes larger and larger, the difference of the accumulated rotational angle from the angle of an extreme position becomes smaller and smaller. In this case, the rotational speed of the output shaft of the servo should be continuously slowed down to make the output shaft of the servo approaching the extreme position slower and slower, thereby avoiding the possible wear on the joint when it is moved to the extreme position.

S104: determining whether the rotational angle of the output shaft of the servo is greater than a preset angle threshold.

That is, it is determined whether the rotational angle of the output shaft of the servo is small enough to be negligible, and the angle threshold may be set according to actual conditions while it should be set to a smaller value, which is generally set to the minimum allowable measurement accuracy in the current detection environment. For example, it may be set to 0.1 degrees, 0.01 degrees, or even 0.001 degrees, or the like. As a special case, it can also be set to 0 degrees. The rotational angle of the output shaft of the servo can be obtained from the servo through, for example, a CAN (controller area network) bus.

If the rotational angle of the output shaft of the servo is greater than the angle threshold, step S105 is executed; and if the rotational angle of the output shaft of the servo is less than or equal to the angle threshold, step S106 is executed.

S105: waiting for a preset second duration.

The second duration may be set according to actual conditions, while it generally should not be too long. For example, it may be set to 0.1 seconds, 0.2 seconds, 0.5 seconds, or the like. As a special case, it can also be set to 0 second, that is, to perform the next rotational angle measurement directly.

If the rotational angle of the output shaft of die servo is greater than the angle threshold, it indicates that the output, shaft of the servo has not moved to the extreme position at (his time, then it returns to step S103 after the second duration until the rotational angle of the output shaft of the servo is less than or equal to the angle threshold.

S106: determining a current rotational position of the output shaft of the servo as a first extreme position.

If the rotational angle of the output shall of the servo is less than or equal to the angle threshold, it indicates that the joint has moved to the extreme position at this time, and the current position of the output shaft of the Servo can be determined as the first extreme position. In which, the first extreme position is the extreme position that the output shall of the servo can reach by rotating in the first direction.

Figure 2:
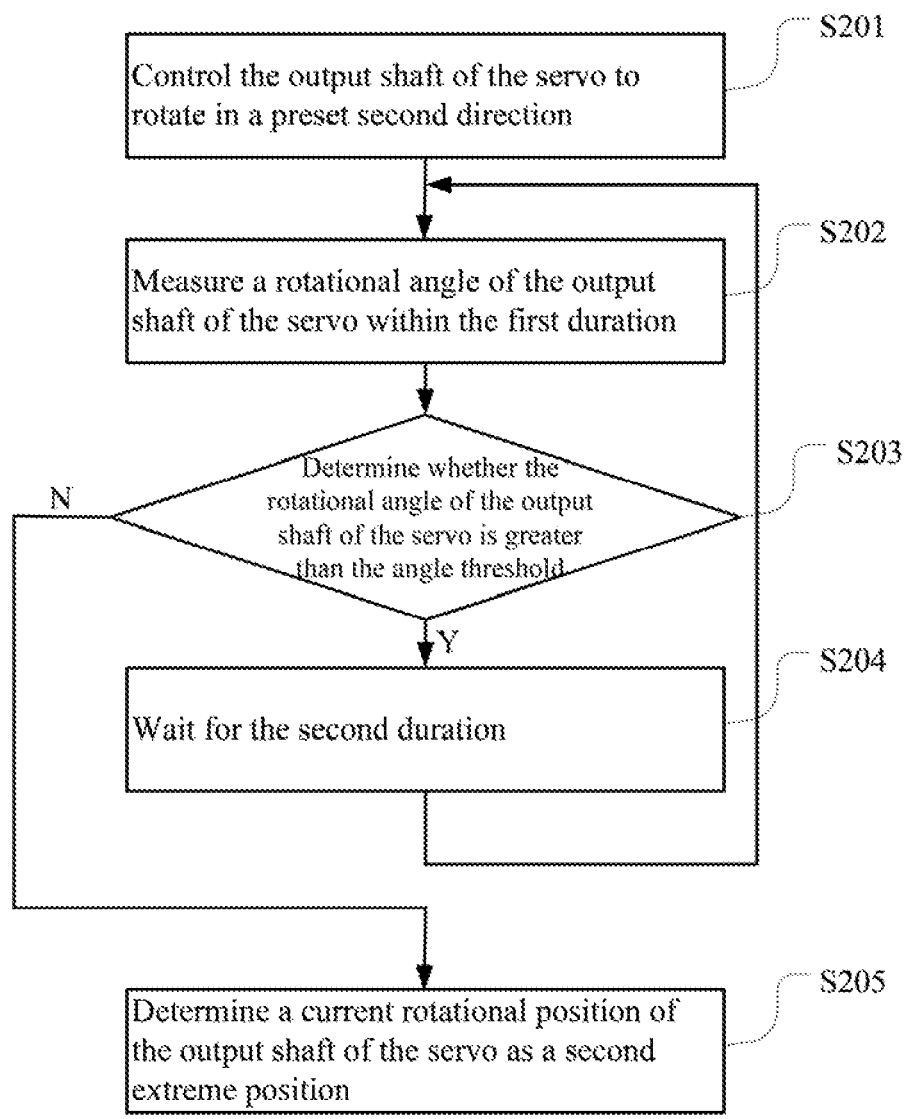
FIG. 2 is a flow chart of using the joint limit detection method of FBS I to detect a second extreme position.

FIG. 2 is a flow chart of using the joint limit detection method of FIG. 1 to detect a second extreme position. After the first extreme position is determined, an extreme position that the output shaft of the servo can reach by rotating in a preset second direction, that is, the second extreme position, can be further determined. The second direction may be opposite to the first direction; if the first direction is a direction in which the output shaft of the servo rotates clockwise, then the second direction is a direction in which the output shaft of the servo rotates counterclockwise; and if the first direction is a direction in which the output shaft of the servo rotates counterclockwise, then the second direction is a direction in which the output shaft of the servo rotates clockwise. As shown in FIG. 2, the method includes the following steps.

S201: controlling the output shaft of the servo to rotate in a preset second direction.

S202: measuring a rotational angle of the output shaft of the servo within the first duration.

S203: determining whether the rotational angle of the output shaft of the servo is greater than the angle threshold.

If the rotational angle of the output shaft of the servo is greater than the angle threshold, step S204 is executed; and if the rotational angle of the output shaft of the servo is less than or equal to the angle threshold, step S205 is executed.

S204: waiting for the second duration.

After the second duration, it returns to step S202 until the rotational angle of the output shaft of the servo is less than or equal to the angle threshold.

S205: determining a current rotational position of the output shaft of the servo as a second extreme position.

The processes of determining the second extreme position are similar to the processes of determining the first extreme position which are described in step S102 to step S106. For details, refer to the detailed description of step S102 to step S106, which are not described herein.

In one embodiment, after the first extreme position and the second extreme position are determined, they can be stored in a storage device such as a FLASH or a hard disk of the robot. During the use (i.e., the movement) of the joint of the robot, the movement of the output shaft of the servo of the joint of the robot is limited according to the actual extreme positions (i.e., the first extreme position and/or the second extreme position). The output shaft of the servo is controlled to stop rotating in the first direction when the output shaft of the servo is in the first extreme position, and the output shaft of the \servo is controlled to stop rotating in the second direction when the output shaft of the servo is in the second extreme position, thereby reducing the wear on the joint.

It should be noted that, the forgoing is the process of perform a joint limit detection to any joint of the robot. If multiple joints are to be detected, the above-mentioned process can be performed on each joint in a predetermined detection order, or the above-mentioned process can be performed on multiple joints simultaneously, while it is necessary to ensure that there is no structural coupling between multiple joints that are simultaneously detected so as to avoid the interference in the detection results.

In summary, in this embodiment, the joint limit detection method includes: (a) determining a servo corresponding to a joint to be detected: (b) controlling an output shaft of the servo to rotate in a preset first direction; (c) measuring a rotational angle of the output shaft of the servo within a preset first duration; (d) determining whether the rotational angle of the output shaft of the servo is greater than a preset angle threshold; (e) repeating the steps (c) and (d) after a preset second duration until the rotational angle of the output shaft of the servo is less than or equal to the preset angle threshold, if the rotational angle of the output shall of the servo is greater than the angle threshold; and (f) determining a current rotational position of the output shaft of the servo as a first extreme position, if the rotational angle of the output shaft of the servo is less than or equal to the angle threshold. Through the present disclosure, the actual extreme position of the output shaft of the servo can be accurately detected, and the movement of the output shaft of the servo of the robot is limited according to the actual extreme positions during the use of the joint of the robot, thereby reducing the wear on the joint.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 3 is a schematic block diagram of a joint limit detection apparatus according to an embodiment of present disclosure. For the convenience of description, only parts related to this embodiment are shown. In this embodiment, the apparatus may be, for example, a portable electronic device or a computer. As shown in FIG. 3, the apparatus may include a storage M, a processor P. The storage M, for example, a hard disk and/or a memory, is configured to store a computer program C executed by the processor P and intermediate data generated when the computer program is executed. The computer program C includes:

a servo determining module 301 configured to determine a servo corresponding to a joint to be detected;

a first rotating module 302 configured to control an output shaft of the servo to rotate in a preset first direction;

a first measuring module 303 configured to measure a rotational angle of the output shaft of the servo within a preset first duration;

a first determining module 304 configured to determine whether the rotational angle of the output shaft of the servo is greater than a preset angle threshold; and a first extreme position determining module 305 configured to determine a current rotational position of the output shall of the servo as a first extreme position, if the rotational angle of the output shaft of the servo is less than or equal to the angle threshold.

Furthermore, the apparatus may further include:

a second rotating module configured to control the output shaft of the servo to rotate in a preset second direction;

a second measuring module configured to measure a rotational angle of the output shaft of the servo within the first duration;

a second determining module configured to determine whether the rotational angle of the output shaft of the servo is greater than the angle threshold; and a second extreme position determining module configured to determine a current rotational position of the output shaft of the servo as a second extreme position, if the rotational angle of the output shall of the servo is less than or equal to the angle threshold.

Furthermore, the apparatus may further include:

a reference position determining module configured to determine whether the output shaft of the servo is at a preset reference position; and a reference position adjusting module configured to adjust the output shaft of the servo to the reference position, if the output shaft of the servo is not at the preset reference position.

Furthermore, the apparatus may further include:

a rotational speed adjusting module configured to adjust the rotational speed of the output shaft of the servo according to the accumulated rotational angle of the output shaft of the servo such that the rotational speed of the output shaft of the servo is negatively correlated with the accumulated rotational angle of the output shaft of the servo, wherein the accumulated rotational angle is the sum of all the measured rotational angles of the output shaft of the servo.

Furthermore, the apparatus may further include:

a braking module configured to control the output shaft of the servo to stop rotating in the first direction if the output shaft of the servo is at the first extreme position during moving the joint.

In this embodiment, each of the above-mentioned modules/units is implemented in the form of software (i.e., the computer program C). In other embodiments, each of the above-mentioned modules/units may be implemented in the form of hardware (e.g., a circuit) or a combination of hardware and software (e.g., a circuit with a single chip microcomputer).

Those skilled in the art may clearly understand that, for the convenience and simplicity of description, the specific operation process of the above-mentioned apparatus, module and/or unit can refer to the corresponding process in the above-mentioned method embodiment which are not described herein.

Figure 4:
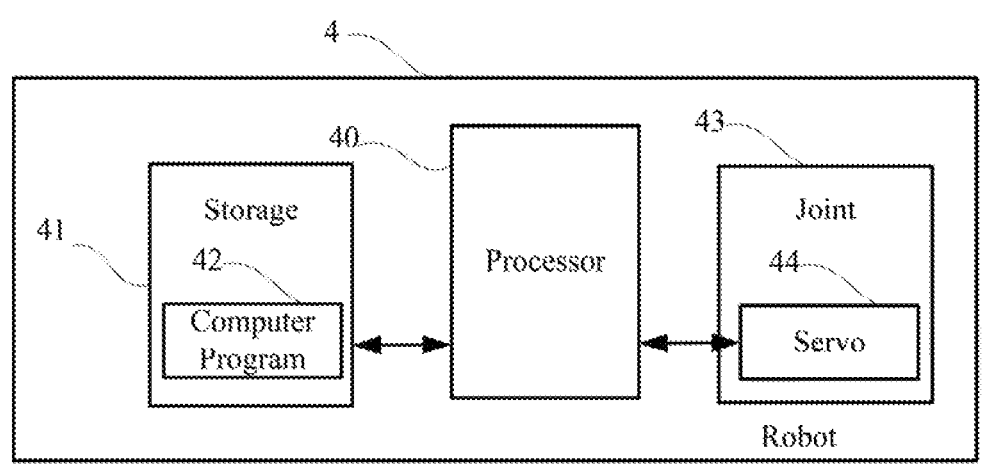
FIG. 4 is a schematic block diagram of a robot according to present disclosure.

FIG. 4 is a schematic block diagram of a robot according to present disclosure. As shown in FIG 4, in this embodiment, a robot 4 includes a processor 40, a storage 41, a computer program 42 which is stored in the storage 41 and executable on the processor 40, and a plurality of joints 43, and each of the joints 43 has a servo 44. When executing (instructions in) the computer program 42, the processor 40 implements the steps in the above-mentioned embodiments of the joint limit detection method, for example, steps S101-S106 shown in FIG. 1. Alternatively, when the processor 40 executes the (instructions in) computer program 42. the functions of each module/unit in the above-mentioned device embodiments, for example, the functions of the modules 301-305 shown in FIG. 3 are implemented.

Exemplarily, the computer program 42 may be divided into one or more modules/units, and the one or more modules/units are stored in the storage 61 and executed by the processor 40 to realize the present disclosure. The one or more modules/units may be a series of computer program instruction sections capable of performing a specific function, and the instruction sections are for describing the execution process of the computer program 42 in the robot 4.

The robot 4 may include, but is not limited to. a processor 40 and a storage 41. It can be understood by those skilled in the art that FIG. 4 is merely an example of the robot 4 and does not constitute a limitation on the robot 4, and may include more or fewer components than those shown in the figure, or a combination of some components or different components, for example, the robot 4 may further include an input/output device, a network access device, a bus, and the like.

The processor 40 may be a central processing unit (CPU), or be other general purpose processor, a digital signal processor (DSP), an application specific integrated circuit (ASIC), a field-programmable gale array (FPGA), or be other programmable logic device, a discrete gate, a transistor logic device, and a discrete hardware component. The general purpose processor may be a microprocessor, or the processor may also be any conventional processor.

The storage 41 may be an internal storage unit of the robot 4, for example, a hard disk or a memory of the robot 4. The storage 41 may also be an external storage device Of the robot 4, for example, a plug-in hard disk, a smart media card (SMC), a secure digital (SD) card. Rash card, and the like, which is equipped on the robot 4. Furthermore, the storage 41 may further include both an internal storage unit and an external storage device, of the robot 4. The storage 41 is configured to store the computer program 42 and other programs and data required by the robot 4. The storage 41 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the Specific name of each functional unit and module is merely for the convenience of distinguishing each other and are not intended to limit the scope of protection of the present disclosure.

For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some Of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module I unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented joint limit detection method for a robot having a plurality of joints each having a servo, comprising executing on a processor of a joint limit detection apparatus the steps of:
    (a) determining a servo corresponding to a joint to be detected;
    (b) controlling an output shaft of the servo to rotate in a preset first direction;
    (c) measuring a rotational angle of the output shaft of the servo within a preset first duration;
    (d) determining whether the rotational angle of the output shaft of the servo is greater than a preset angle threshold;
    (e) repeating the steps (c) and (d) until the rotational angle of the output shaft of the servo is less than or equal to the preset angle threshold, in response to the rotational angle being greater than the angle threshold; and
    (f) determining a current rotational position of the output shaft of the servo as a first extreme position, in response to the rotational angle of the output shaft of the servo being less than or equal to the angle threshold.

2. The method of claim 1, wherein after the step (f) further comprises:
    (g) controlling the output shaft of the servo to rotate in a preset second direction;
    (h) measuring a rotational angle of the output shaft of the servo within the first duration;
    (i) determining whether the rotational angle of the output shall of the servo is greater than the angle threshold:
    (j) repeating the Steps (h) and (i) until the rotational angle of the output shaft of the servo is less than or equal to the preset angle threshold, in response to the rotational angle of the output shaft of the servo being greater than the angle threshold; and
    (k) determining a current rotational position of the output shaft of the servo as a second extreme position, in response to the rotational angle of the output shaft of the servo being less than or equal to the angle threshold.

3. The method of claim 1, wherein an initial speed of the servo tta rotate is positively correlated with a movement angular range of the joint.

4. The method of claim 2, wherein the preset second direction is opposite to the preset first direction.

5. The method of claim 1, wherein before the step (b) further comprises;
    determining whether the output shall of the servo is at a preset reference position; and
    adjusting the output shaft of the servo to the reference position, in response to the output shalt of the servo being not at the preset reference position.

6. The method of claim 1, wherein after the step (C) further comprises:
    adjusting the rotational speed of the output shaft of the servo according to the accumulated rotational angle of the output shaft of the servo such that the rotational speed of the output shaft of the servo is negatively correlated with the accumulated rotational angle of the output shaft of the servo, wherein the accumulated rotational angle is the sum of all the measured rotational angles of the output shaft of the servo.

7. The method of claim 1, wherein after the step (f) further comprises:
    controlling the output shaft of the servo to stop rotating in the first direction in response to the output shaft or the servo being at the first extreme position during moving the joint.

8. The method of claim 1, wherein in the step (e), repeating the steps (c) and (d) after a preset second duration in response to determining that the rotational angle is greater than the angle threshold, and the second duration is equal to or greater than zero seconds.

9. The method of claim 1, wherein the preset first direction is a direction in which the output shaft of the servo rotates clockwise, or a direction in which the output shaft of the servo rotates counterclockwise.

10. A robot, comprising:
    a plurality of joints each having a servo;
    a memory;
    a processor; and
    one or more computer programs stored in the memory and executable on the processor, wherein the one or more computer programs comprise:
    instructions for executing step (a) of determining a servo corresponding to a joint to be detected;
    instructions for executing step (b) of controlling an output shaft of the servo to rotate in a preset first direction:,
    instructions for executing step (c) of measuring a rotational angle of the output shalt of the servo within a preset first duration;
    instructions for executing step (c) of determining whether the rotational angle of the output shaft of the servo is greater than a preset angle threshold;
    instructions for executing step (e) of repeating the instructions for executing steps (c) and (d) until the rotational angle of the output shaft or the servo is less than or equal to the preset angle threshold, in response to the rotational angle of the output shaft of the servo being greater than the angle threshold; and
    instructions for executing step (f) of determining a current rotational position of the output shaft of the servo as a first extreme position, in response to the rotational angle of the output shall of the servo being less than or equal to the angle threshold.

11. The robot of claim 10, wherein the one or more computer programs further comprise:
    instructions for executing step (g) of controlling the output shaft of the servo to rotate in a preset second direction;
    instructions for executing step (h) of measuring a rotational angle of the output shaft of the servo within the first duration;
    instructions for executing step (i) of determining whether the rotational angle of the output shaft of the servo is greater than the angle threshold;

instructions for executing step (j) of repeating the instructions for executing steps (h) and (i) until the rotational angle of the output shaft of the servo is less than or equal to the preset angle threshold, in response to the rotational angle of the output shaft of the servo being greater than the angle threshold; and instructions for executing step (k) determining a current rotational position of the output shaft of the servo as a second extreme position, in response to the rotational angle of the output shaft of the servo being less than or equal to the angle threshold.

12. The robot of claim 10, wherein the one or more computer programs further comprise;
   instructions for determining whether the output shaft of the servo t is at a preset reference position; and
   instructions for adjusting the output shaft of the servo to the reference position, in response to the output shaft of the servo being not at the preset reference position.

13. The robot of claim 10, wherein the one or more computer programs thrther comprise:
   instructions for adjusting the rotational speed of the output shaft of the servo according to the accumulated rotational angle of the output shaft of the servo such that the rotational speed of the output shaft of the servo is negatively correlated with the accumulated rotational angle of the output shaft of the servo, wherein the accumulated rotational angle is the sum of all the measured rotational angles of the output shaft of the servo.

14. The robot of claim 10, wherein the one car more computer programs further comprise;
   instructions for controlling the output shaft of the servo to stop rotating in the first direction in response to the output shaft of the servo being at the first extreme position during moving the joint.

15. The robot of claim 10, wherein in the step (e), repeating the steps (c) and (d) after a preset second duration in response to determining that the rotational angle is greater than the angle threshold, and the second duration is equal to or greater than zero seconds.

16. The robot of claim 10, wherein the paeset first direction is a direction in which the output shaft of the servo rotates clockwise, or a direction in which the output shaft of the servo rotates counterclockwise.

17. The robot of claim 10, wherein an initial speed of the servo to rotate is positively correlated with a movement angular range of the joint.

* * * * *